(12) United States Patent
Wirola et al.

(10) Patent No.: US 10,200,965 B2
(45) Date of Patent: Feb. 5, 2019

(54) ANALYSIS AND MONITORING OF A POSITIONING INFRASTRUCTURE

(71) Applicant: HERE GLOBAL B.V., Eindhoven (NL)

(72) Inventors: Lauri Aarne Johannes Wirola, Tampere (FI); Muhammad Irshan Khan, Tampere (FI); Pavel Ivanov, Tampere (FI); Jari Tapani Syrjärinne, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/638,824

(22) Filed: Jun. 30, 2017

(65) Prior Publication Data

US 2018/0007654 A1    Jan. 4, 2018

(30) Foreign Application Priority Data

Jun. 30, 2016 (GB) .................................. 1611440.7

(51) Int. Cl.
*H04L 29/12* (2006.01)
*H04W 64/00* (2009.01)
(Continued)

(52) U.S. Cl.
CPC .......... *H04W 64/00* (2013.01); *G01S 5/0252* (2013.01); *H04W 4/04* (2013.01); *H04W 40/244* (2013.01); *H04W 88/02* (2013.01)

(58) Field of Classification Search
CPC ... H04W 4/046; H04W 24/02; H04W 64/003; H04W 16/18; H04W 4/025; H04W 16/24; G01S 5/0252; H04L 67/10
(Continued)

(56) References Cited

U.S. PATENT DOCUMENTS 7,835,749 B1    11/2010  Hart et al.
2002/0142766 A1*  10/2002  Iyer ...................... H04W 24/02
                                                                         455/423
(Continued)

FOREIGN PATENT DOCUMENTS

WO    WO 2011/008613 A1    1/2011
WO    WO 2014/000090 A1    1/2014
(Continued)

OTHER PUBLICATIONS

Combined Search and Examination Report for Great Britain Application No. GB1611440.7 dated Dec. 28, 2016.
(Continued)

*Primary Examiner* — Phuoc H Doan
(74) *Attorney, Agent, or Firm* — Alston & Bird LLP

(57) ABSTRACT

It is disclosed a method comprising one or more of the following: a first determining whether or not at least one characteristic that has been derived from a coverage map being representative of respective coverage areas of a plurality of beacons deployed in an area is affected at least by a count of the beacons deployed in the area and to their respective positions and affects an accuracy of a positioning of one or more terminals located in the area that is at least based on the coverage map and on respective fingerprints provided by the one or more terminals, is considered at least partially insufficient, and a providing, in case the first determining has come to an affirmative result, of first information on the at least one characteristic considered at least partially insufficient and/or on instances that at least contributed to the at least one characteristic being considered at least partially insufficient; a second determining, at least based on one or more fingerprints received from one or more terminals, whether or not an existing coverage map for an area can still be considered to be representative of respective coverage areas of a plurality of beacons deployed
(Continued)

in the area, and a providing, in case the second determining has come to an affirmative result, of second information indicative of the result and/or indicative of why the existing coverage map is no longer considered to be representative of the respective coverage areas of the plurality of beacons deployed in the area; a third determining whether or not a status of a beacon on which information is transmitted by the beacon and received and provided by a terminal is considered improvable, and a providing, in case the third determining has come to an affirmative result, of third information on the beacon and/or on the status of the beacon; a deriving, from a coverage map that is representative of respective coverage areas of a plurality of beacons deployed in an area, of respective positions of one or more of the beacons, and a providing of fourth information representative of one or more of the derived respective positions of the one or more beacons.

20 Claims, 4 Drawing Sheets

(51) Int. Cl.
 *H04W 4/04* (2009.01)
 *H04W 40/24* (2009.01)
 *G01S 5/02* (2010.01)
 *H04W 88/02* (2009.01)

(58) Field of Classification Search
 USPC .............. 370/328, 331; 455/405, 410, 456.1
 See application file for complete search history.

(56) References Cited

U.S. PATENT DOCUMENTS

2014/0207282 A1* 7/2014 Angle .................. H04L 12/282
 700/257
2015/0105098 A1 4/2015 Sridhara et al.

FOREIGN PATENT DOCUMENTS

WO WO 2015/014544 A1 2/2015
WO WO 2016/086993 A1 6/2016
WO WO 2016/096010 A1 6/2016

OTHER PUBLICATIONS

Minkyu Lee et al: "Crowdsourced Radiomap for Room-level Place recognition in urban environment", Pervasive Computing and Communications Workshops (Percom Workshops), 2010 8th IEEE International Conference on, IEEE, Piscataway, NJ, USA, Mar. 29, 2010 (Mar. 29, 2010), pp. 648-653, XP031679892.
Thomas Gallagher et al: "Database updating through user feedback in fingerprint-based Wi-Fi location systems", Ubiquitous Positioning Indoor Navigation and Location Based Service (UPINLBS), 2010, IEEE, Piscataway, NJ, USA, Oct. 14, 2010 (Oct. 14, 2010), pp. 1-8, XP031815434.
Cho Y et al: "WiFi AP Position Estimation using Contribution from Heterogeneous Mobile Devices", Navigation: Journal of the Institute of Navigation, Apr. 23, 2012 (Apr. 23, 2012),-Apr. 23, 2012 (Apr. 23, 2012), pp. 562-567, XP056003809.
Extended European Search Report for Application No. 17177431.8 dated Apr. 30, 2018, 18 pages.
Partial European Search Report for European Application No. 17177431.8 dated Dec. 6, 2017, 13 pages.

* cited by examiner

ANALYSIS AND MONITORING OF A POSITIONING INFRASTRUCTURE

CROSS-REFERENCE TO RELATED APPLICATIONS

This application claims priority to GB Application No. 1611440.7, filed Jun. 30, 2016, the entire contents of which are incorporated herein by reference.

FIELD OF THE DISCLOSURE

The invention relates to the field of positioning terminals in an area based on a coverage map, in particular a radio coverage map, for the area.

BACKGROUND

Indoor positioning (i.e. position finding) requires novel systems and solutions that are specifically developed and deployed for this purpose. The "traditional" positioning technologies, which are mainly used outdoors, e.g. satellite and cellular positioning technologies, generally cannot deliver such performance indoors that would enable seamless and equal navigation experience in both environments. The required positioning accuracy (e.g. 2-3 m), coverage (e.g. ~100%) and floor detection are challenging to achieve with satisfactory performance levels with the systems and signals that were not designed and specified for the indoor use cases in the first place. Satellite-based radio navigation signals simply do not penetrate enough through the walls and roofs for adequate signal reception, and the cellular signals usually have too narrow bandwidth for accurate ranging by default.

For an indoor positioning solution to be commercially successful, that is, being globally scalable, having low maintenance and deployment costs, and offering acceptable end-user experience, the solution is advantageously based on an existing infrastructure in the buildings and on existing capabilities in the consumer devices. This leads to the conclusion that the indoor positioning is advantageously based on Wi-Fi- and/or Bluetooth (BT)-technologies that are already supported in every smartphone, tablet, laptop and even in the majority of the feature phones. It is, thus, required to find a solution that uses the Wi-Fi- and BT-radiosignals in such a way that makes it possible to achieve e.g. 2-3 m horizontal positioning accuracy, e.g. close to 100% floor detection with the ability to quickly build the global coverage for this approach.

A promising approach for radio-based indoor positioning developed by the applicant of the present patent application models the radio environment (provided e.g. by Wi-Fi or Bluetooth beacons, or by beacons of another suited radio system) based on observed Received Signal Strength (RSS)-measurements as (e.g. 2-dimensional) radiomaps and is hereby able to capture the dynamics of the indoor radio propagation environment in a highly accurate way, that may even lend itself to compression. This makes it possible to achieve unprecedented horizontal positioning accuracy with the radio (e.g. Wi-Fi or Bluetooth) signals only within the coverage of the created radiomaps and also gives highly reliable floor detection.

Huge volumes of indoor radio measurements data can be harvested via crowd-sourcing if the consumer devices are equipped with the necessary functionality to enable the Wi-Fi/Bluetooth data collection as a background process, naturally with the end-user consent. It is also possible to use volunteers to survey the sites (buildings) in exchange of reward or recognition and get the coverage climbing up globally in the places and venues important for the key customers.

SUMMARY OF SOME EXAMPLE EMBODIMENTS OF THE INVENTION

One method for enabling indoor positioning in a venue is to deploy e.g. Bluetooth beacons. Typically the beacons are simply installed here-and-there in a more-or-less even mesh. However, the quality of the deployment cannot be evaluated simply by checking that the beacon density is adequate. Building topology may affect the signal penetration significantly and thus the final deployment quality analysis can only be done after the radio signal survey has been done.

Also, after some time it is often impossible to remember, where the beacons were installed. If they need to be replaced for any reason, it may be practically impossible to find them all. Thus, it is desirable to have an automated way to detect the beacon locations.

Also, generally the question arises, if all of the beacons are working—if a beacon stops broadcasting, the positioning is still possible with the other beacons, but the accuracy may suffer. Detecting this may be difficult. Thus, again automated mechanisms are desirable for monitoring the positioning infrastructure health.

Some of the considerations also apply to positioning that is based on Wi-Fi beacons. The infrastructure may undergo changes, which may or may not be controlled/known. In any case, the Wi-Fi infrastructure management may be disconnected from the positioning infrastructure management. Thus, it may happen that the personnel responsible for maintaining and servicing the Wi-Fi infrastructure do not notify the other department taking care of the positioning technology about the changes.

It is, inter alia, an object of the present invention to improve one or more of the above-described shortcomings.

According to a first exemplary aspect of the present invention, a method is disclosed, the method comprising one or more (e.g. all) of the following:

(i) a first determining whether or not at least one characteristic that has been derived from a coverage map being representative of respective coverage area of a plurality of beacons deployed in an area is affected at least by a count of the beacons deployed in the area and to their respective positions and affects an accuracy of a positioning of one or more terminals located in the area that is at least based on the coverage map and on respective fingerprints provided by the one or more terminals, is considered at least partially insufficient, and a providing, in case the first determining has come to an affirmative result, of first information on the at least one characteristic considered at least partially insufficient and/or on instances that at least contributed to the at least one characteristic being considered at least partially insufficient;

(ii) a second determining, at least based on one or more fingerprints provided by one or more terminals, whether or not an existing coverage map for an area can still be considered to be representative of respective coverage areas of a plurality of beacons deployed in the area, and a providing, in case the second determining has come to an affirmative result, of second information indicative of the result and/or indicative of why the existing coverage map is no longer considered to be representative of the respective coverage areas of the plurality of beacons deployed in the area;

(iii) a third determining whether or not a status of a beacon on which information is transmitted by the beacon and received and provided by a terminal is considered improvable, and a providing, in case the third determining has come to an affirmative result, of third information on the beacon and/or on the status of the beacon;

(iv) a deriving, from a coverage map that is representative of respective coverage areas of a plurality of beacons deployed in an area, of respective positions of one or more of the beacons, and a providing of fourth information representative of one or more of the derived respective positions of the one or more beacons.

This method may for instance be performed and/or controlled by an apparatus, e.g. by a server or by a component, module or functional unit thereof. Alternatively, this method may be performed and/or controlled by more than one apparatus, e.g. by multiple servers, e.g. of a server cloud.

According to a further exemplary aspect of the invention, a computer program is disclosed, the computer program when executed by a processor causing an apparatus (e.g. a server or a component, module or functional unit thereof) to perform and/or control the actions of the method according to the first exemplary aspect of the invention. The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory (e.g. a Read-Only Memory (ROM)) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect of the invention. The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus (e.g. a server or a component, module or functional unit thereof) at least to perform and/or control the method according to the first exemplary aspect of the invention.

The above-disclosed apparatus according to any aspect of the invention may be a component, module or functional unit for a device. The apparatus may for example be a chip. Alternatively, the disclosed apparatus according to any aspect of the invention may be a device, for instance a server. The disclosed apparatus according to any aspect of the invention may comprise only the disclosed components (e.g. means, processor, memory) or may further comprise one or more additional components.

In exemplary embodiments of the present invention, with respect to the first determining, the at least one characteristic derived from the coverage map (e.g. a radiomap) is for instance considered at least partially insufficient if too few beacons are observable at one or more pre-defined locations of the area, if the respective dynamic range of received beacon signals is too small at one or more pre-defined locations of the area, if the geometric arrangement of beacons observable at one or more pre-defined locations of the area is unfavourable for positioning, and/or if distances between neighboring beacons are too large. Related first information is then provided (e.g. displayed on a user interface) to allow improvement of this situation, e.g. by adding more beacons to the area.

In exemplary embodiments of the present invention, with respect to the second determining, it is established, based on one or more fingerprints provided by terminals and on the existing coverage map, if beacons (or too many beacons) have moved, disappeared and/or appeared and/or if the received signal strength levels as indicated by the existing coverage map are still valid. Related second information is then provided (e.g. displayed on a user interface), e.g. to alert a user that the coverage map is outdated.

In exemplary embodiments of the present invention, with respect to the third determining, it is checked whether a battery status of a beacon is still sufficient. This status is transmitted from the beacon and received by a terminal, which then provides this status to another apparatus for analysis. Related third information is then provided by this apparatus (e.g. displayed on a user interface), e.g. to alert a user that the battery has to be charged or replaced now or soon.

In exemplary embodiments of the present invention, the positions of one or more of the beacons are derived, and fourth information is provided (e.g. displayed on a user interface) to allow a user to find one or more of these beacons (e.g. in the context of the first information and/or the third information provided by the first determining and the third determining, respectively).

Exemplary embodiments of the present invention thus allow (in particular automatically) analysing and/or monitoring a positioning infrastructure comprising at least the one or more beacons deployed in the area. The respective information may then for instance be provided to an operator via a user interface to enable the operator to improve the positioning infrastructure, e.g. by adding and/or moving beacons, servicing beacons (e.g. by replacing batteries) and/or by causing a re-survey of the (outdated) coverage map. As far as this analysis and/or monitoring is based on the coverage map, this may for instance be a coverage map that has been determined (e.g. at least partially by crowd-sourcing) for and is used for positioning of terminals in the area. This analysis and/or monitoring thus advantageously constitutes an add-on to an existing positioning system that is based on such a coverage map. The analysis and/or monitoring may for instance be performed by the same apparatus that controls (e.g. stores) the coverage map and uses or provides (e.g. to another entity) the coverage map for the purpose of positioning one or more terminals based on the coverage map, or by another apparatus.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS OF THE INVENTION

Figure 1:
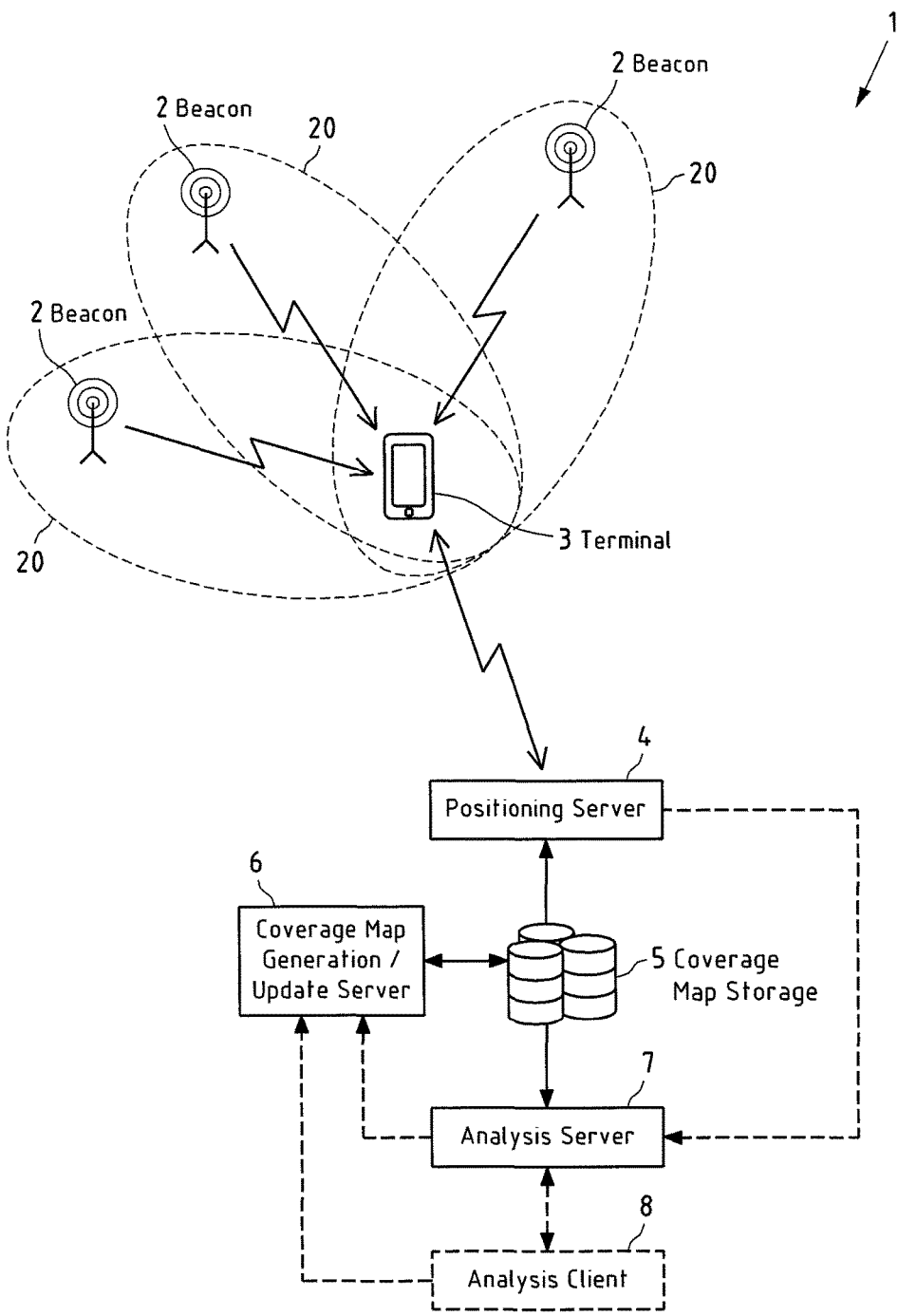
FIG. 1 is a schematic illustration of a system in which example embodiments of the present invention may be used.

FIG. 1 is a schematic illustration of a system 1, in particular a positioning system, in which example embodiments of the present invention may be used. System 1 comprises a plurality of beacons 2 deployed in an area, which may for instance be an indoor area. In the following, it is exemplarily assumed that the beacons 2 are radio beacons. Non-limiting examples of radio beacons are Bluetooth beacons (including e.g. iBeacons, Eddystone or AltBeacons), Wi-Fi (e.g. IEEE 802.11-based) beacons, NFC (Near Field Communication) beacons, AM (Amplitude modulated), VHF (very high frequency), or UHF (ultra high frequency) broadcast radio stations and cellular base stations (e.g. GSM (Global System for Mobile Communications), UMTS (Universal Mobile Telecommunications System), LTE (Long Term Evolution) base stations). Alternatively, the beacons may be based on optic or acoustic signal transmission.

Each of beacons 2 is associated with a respective coverage area 20, which is representative of an area (in particular a two-dimensional (2D) or three-dimensional (3D) area) in which the respective beacon 2 is observable by a terminal 3. A beacon 2 may for instance be observable by a terminal 3 if the terminal can receive a signal from beacon 2 with a signal strength that is equal to or larger-than-or-equal-to a pre-defined threshold, and/or if terminal 3 is able to receive a signal from beacon 2 and obtain an identifier of beacon 2 from the received signal, e.g. by demodulation and decoding.

A coverage area 20 of a beacon 2 may for instance be represented as a plurality of value tuples, wherein each value tuple defines a location (e.g. in terms of coordinates, e.g. geodetic coordinates) and information representative of a strength with which a signal transmitted by the beacon 2 can be received at this position (received signal strength, RSS). Here and in the following, when referring to a RSS, in particular the average RSS is meant (e.g. averaged over a plurality of measurements at the same position over time). The RSS may for instance be measured in dBm, for instance with a reference value of 1 mW, with or without the Doppler effect being averaged out therein. The positions may for instance lie on a grid of positions, in particular a regular grid. The positions may for instance be 2D or 3D positions. Accordingly, the grid may then be a 2D or 3D grid. In case of 3D positions, one dimension may for instance be represented by a floor level, and the other two dimensions may describe a 2D position on a floor indicated by the floor level.

Alternatively, a coverage area 20 of a beacon 2 may for instance be represented by a model that describes the strength of a signal transmitted by the beacon 2 received at positions in the coverage area, e.g. based on a path-loss model describing the decline of the received signal strength as a function of the distance from the position of beacon 2. The received signal strength may for instance be modeled by means of lines of equal received signal strength (e.g. in case of a 2D model or per floor of a 3D model), wherein the position of each line is e.g. modeled by a respective elliptical model, so that the coverage model comprises a plurality of ellipses, each with a different received signal strength.

The respective coverage areas 20 of the plurality of beacons 2 deployed in the area may for instance be represented by a coverage map. For instance, the coverage may be based on a grid of (2D or 3D) positions, wherein for each grid position, an information is available that indicates which beacon is observable at this position (e.g. by means of a beacon identifier) and with which received signal strength. In case of radio beacons, the coverage map is also known as a radiomap.

It should be noted, however, that a coverage area 20 may also be represented without information on a received signal strength, and then merely reflect where the beacon of the coverage area 20 is observable. Then, also the coverage map may only be indicative of where a beacon 2 can be observed, but not with which received signal strength.

The coverage map may for instance be generated and/or updated by a coverage map generation/update server 6 and stored in a coverage map storage 5. The coverage map generation/update server 6 may for instance generated and/ or update the coverage map based at least partially based on crowd-sourcing. To this end, e.g. a plurality of terminals that are equipped with position sensors (e.g. GNSS (Global Navigation Satellite System) sensors such as GPS (Global Positioning System) sensors) or can otherwise (e.g. determine their position) provide, for a plurality of positions in the area where the beacons 2 are deployed, information on the respective position and on the one or more beacons 2 that can be observed at the respective position. Optionally, further information on the RSS with which signals from the respective beacons 2 are observed at the respective position may be provided by the terminals. From this information, server 6 may then generate a coverage map for the area or may update an existing coverage map for the area. For instance, each information on a position and on the one or more beacons observable at this position (optionally with associated RSS values) may be processed by choosing, from a grid, the position that is closest to the position indicated by the information and associating the one or more beacons (and the associated RSS values, if available), with this chosen grid position.

The coverage map stored in coverage map storage 5 is available to a positioning server 4 (e.g. via a network not shown in FIG. 1, e.g. via the Internet) to enable positioning server 4 to estimate respective positions of terminals 3 located in the area where the beacons 2 are deployed. The terminals 3 (of which only one is shown in FIG. 1) may for instance be capable of observing and identifying beacons 2, in particular by receiving signals transmitted by the beacons 2 and by evaluating identification information comprised in these signals. This identification information may for instance be a respective identifier of the respective beacon 2, which may for instance be (e.g. globally or at least locally) unique. In case of Wi-Fi beacons, the identifier may for instance be an BSSID (Basic Service Set Identifier).

Terminals 3 for instance determine (in particular measure) so-called fingerprints. A fingerprint provided by a terminal 3 may for instance comprise respective identifiers of the one or more beacons 2 that are observable by the terminal 3 at the current position of the terminal 3, optionally with associated RSS values. Based on such a fingerprint, an entity having access to a coverage map for the area in which terminal 3 is located can determine an estimate of the position of terminal 3. This entity may, as exemplarily shown in FIG. 1, be positioning server 4, which receives the fingerprint from terminal 3 (via an at least partially wireless connection that may involve further infrastructure, e.g. of a cellular communication system and/or a Wi-Fi system) and returns an estimate of the position of terminal 3 back to terminal 3. Alternatively, this entity may be terminal 3 or a part thereof. This requires terminal 3 to have access to the coverage map, which may for instance be accomplished by storing a local copy of at least a part of the coverage map on terminal 3. Therein, an accuracy of the estimate of the position of terminal 3 may increase with the number of the beacons 20 observable at the position of the terminal 3 and/or with the arrangement of the beacons 20 with respect to the position of the terminal 3. The position of the terminal 3 is for instance estimated to lie in the center of the intersection of the respective coverage areas of the beacons that are observed by terminal 3. The accuracy of the position estimate is generally higher if also RSS information is provided in the fingerprint and can be compared against the radiomap.

The terminals 3 may for instance not comprise GNSS sensors and thus may have to rely on a fingerprint-based positioning approach either performed by a positioning server 4 or the terminal 3 itself. The fingerprint-based positioning approach may however also constitute an add-on to an existing further positioning technique (like a GNSS sensor based positioning technique) that is implemented in terminal 3.

Terminals 3 may for instance be electronic devices, in particular portable electronic devices (e.g. with a weight less than 2 kg or 200 g, to name but a few examples). Terminals 3 may for instance be mobile phones (e.g. smartphones), portable digital assistants, computers (such as for instance laptops or tablets), multimedia devices (such as audio- and/or video players), gaming devices or smart watches, to name but a few non-limiting examples. Depending on the type of beacon 2 deployed in the area, e.g. Bluetooth and/or Wi-Fi beacons, the terminals 3 may for instance be capable of receiving and at least partially processing (e.g. to at least be able to derive a beacon identifier and to optionally determine an RSS value) Bluetooth and/or Wi-Fi signals, to name but some examples.

The system 1 further comprises an analysis server 7, which allows improving the positioning quality of system 1 in various ways, as will be further described below. Analysis server 7 has access to the coverage map stored in coverage map storage 5, and optionally interfaces with positioning server 4 (e.g. to obtain fingerprints or information derived from fingerprints from positioning server 4) and/or coverage map generation/update server (e.g. to trigger updating of an existing coverage map). Analysis server 7 further optionally interfaces with an analysis client 8. Analysis client 8 may for instance be a device (e.g. a computer) of an operator on which device information on characteristics of the deployment of beacons 20 in the area, on a respective status of at least some of the beacons 20, on a respective position of at least some of the beacons and/or on the actuality of the existing coverage map for the area is provided to the operator. The functionality of analysis client 8 may however equally well be integrated in to analysis server 7, so that analysis server 7 and analysis client 8 may then be substituted by a single analysis apparatus (not shown in FIG. 1). In the following, when referring to analysis 7, also such an analysis apparatus shall be considered to be referred to instead.

It should be noted that positioning server 4 and analysis server 7 could for instance be formed by a single server.

The first exemplary aspect of the invention is directed to a method, which comprises one or more of the following:

(i) a first determining whether or not at least one characteristic that has been derived from a coverage map being representative of respective coverage areas of a plurality of beacons deployed in an area is affected at least by a count of the beacons deployed in the area and to their respective positions and affects an accuracy of a positioning of one or more terminals located in the area that is at least based on the coverage map and on respective fingerprints provided by the one or more terminals, is considered at least partially insufficient, and a providing, in case the first determining has come to an affirmative result, of first information on the at least one characteristic considered at least partially insufficient and/or on instances that at least contributed to the at least one characteristic being considered at least partially insufficient;

(ii) a second determining, at least based on one or more fingerprints provided by one or more terminals, whether or not an existing coverage map for an area can still be considered to be representative of respective coverage areas of a plurality of beacons deployed in the area, and a providing, in case the second determining has come to an affirmative result, of second information indicative of the result and/or indicative of why the existing coverage map is no longer considered to be representative of the respective coverage areas of the plurality of beacons deployed in the area;

(iii) a third determining whether or not a status of a beacon on which information is transmitted by the beacon and received and provided by a terminal is considered improvable, and a providing, in case the third determining has come to an affirmative result, of third information on the beacon and/or on the status of the beacon;

(iv) a deriving, from a coverage map that is representative of respective coverage areas of a plurality of beacons deployed in an area, of respective positions of one or more of the beacons, and a providing of fourth information representative of one or more of the derived respective positions of the one or more beacons.

This method may for instance be performed and/or controlled by analysis server 7 of the system 1 of FIG. 1. This method may comprise only one of the alternatives (i) to (iv), or groups of two or more of these alternatives (i) to (iv), or all of these alternatives (i) to (iv). If two or more of the alternatives (i), (ii) and (iv) are comprised by the method, the same coverage map is concerned in all of these alternatives. In the following, characteristics and details of these alternatives (i) to (iv) will be discussed with reference to the flowcharts of FIGS. 2 and 4-6 below.

Figure 2:
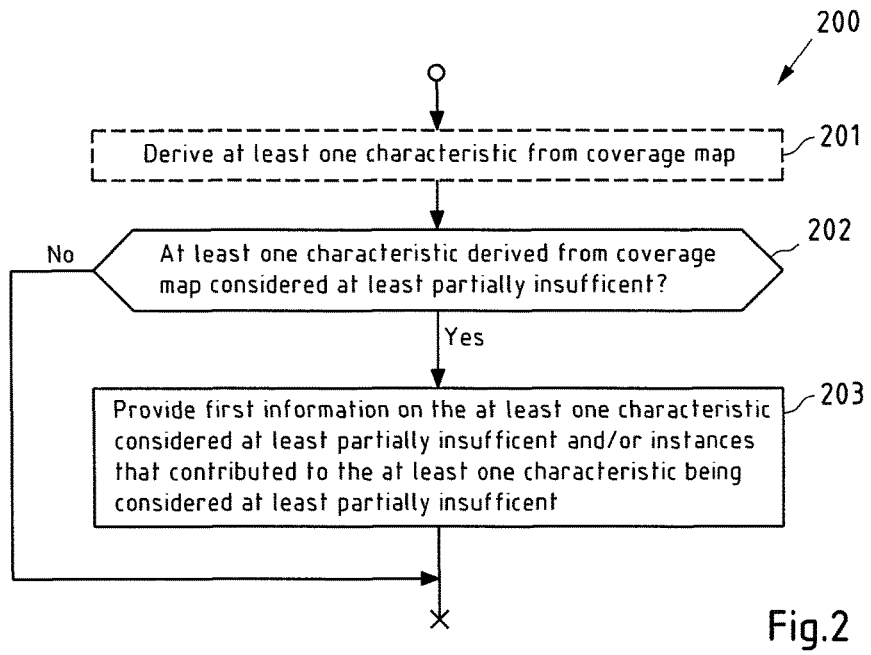
FIG. 2 is a flow chart illustrating an example embodiment of a method according to the first aspect of the invention.

FIG. 2 is a flow chart 200 illustrating an example embodiment of a method according to the first aspect of the invention, in particular with respect to its alternative (i).

In a step 201 of flow chart 200, which step 201 is optional in a sense that is does not necessarily have to be (but of course can be) performed by the same apparatus that performs the step 202 and 203 of flow chart 200, at least one characteristic is derived from an existing coverage map for an area where a plurality of beacons 20 have been deployed. The at least one characteristic may for instance be a characteristic of the deployment of beacons in the area. The at least one characteristic may for instance be derived only from the existing coverage map, i.e. without reference to further information. For instance, the at least one characteristic may for instance be derived from the existing coverage map without referring to information provided by terminals 3 (such as for instance fingerprints or other information e.g. derived by the terminals or other entities from fingerprints). As explained above, the coverage map is representative of respective coverage areas 20 of a plurality of beacons 20 deployed in an area. The at least one characteristic is affected at least by a count of the beacons 20 deployed in the area and to their respective positions. A change of the number of beacons 20 deployed in the area and or of a respective position of one or more of these beacons 20 may thus at least partially change the at least one characteristic. The at least one characteristic furthermore affects an accuracy of a positioning of one or more terminals 3 located in the area that is at least based on the coverage map and on respective fingerprints provided by the one or more terminals. As explained above, a fingerprint may for instance comprise respective identifiers of one or more beacons 20 observable at position of a terminal 3 and optionally information on respective strengths of signals received from the one or more beacons 20. Examples for the at least one characteristic will be provided further below.

In a step 202, it is determined whether or not at least one characteristic derived from the coverage map (e.g. the at least one characteristic derived in step 201) is considered at least partially insufficient. This determining may for instance be based on one or more pre-defined rules reflecting in which situations the at least one characteristic shall be considered sufficient or at least partially insufficient. The finding of insufficiency may pertain to the entire at least one characteristic, or only to a part thereof.

Step 203 is performed in case step 202 has come to an affirmative result, otherwise, the flow chart 200 terminates. In step 203, first information on the at least one characteristic considered at least partially insufficient and/or on instances (e.g. in the deployment of beacons 20 in the area) that at least contributed to the at least one characteristic being considered at least partially insufficient are provided. The first information may for instance be provided by transmission to another entity, or by output via a user interface, such as for instance a display (e.g. a display of analysis server 7 or analysis client 8).

In example embodiments of the invention, at least one of the at least one characteristic may for instance consider at least one or more of the following metrics (a) to (d):

(a) Respective numbers of all respective one or more beacons 20 respectively observable at a plurality of pre-defined locations in the area or of a subgroup of these all respective one or more beacons 20. The numbers may for instance constitute a set of numbers, with each number pertaining to a respective pre-defined location (e.g. to a pre-defined grid position of a grid) and indicating how many beacons 20 are observable at the respective pre-defined location at all. Alternatively, each number may indicate how many beacons 20 having a pre-defined property are observable at the respective pre-defined location. This pre-defined property may for instance be that an RSS value of the respective beacon has to be larger than or larger-than-or-equal-to a predefined threshold value. This pre-defined property may for instance introduce a safety margin for the RSS value that accounts e.g. for temporary attenuation of the beacon signal by moving objects or persons. The numbers may allow analyzing if, at least at the pre-defined locations, a minimum number of beacons 20 is observable, or a minimum number of beacons 20 having the pre-defined property are observable.

(b) At least one characteristic of respective signal strengths with which one or more respective beacons 20 are respectively observable at a plurality of pre-defined locations in the area. The at least one characteristic may for instance be a dynamic range or a characteristic of a statistical distribution of the signal strengths with respect to a location of the pre-defined locations. It may thus for instance be detected that a dynamic range of the RSS values pertaining to one or more beacons observable at a location of the pre-defined locations (e.g. the difference between the largest RSS value (associated with an observable beacon) and the smallest RSS value (associated with another observable beacon) among these RSS values) is too small. It may for instance be desired to have, at each location of the pre-defined locations and with respect to the one or more beacons that are respectively observable at this location, a large dynamic range (e.g. at least equal to or larger than a pre-defined threshold) of the RSS values of these one or more beacons. It may for instance be desirable, in order to achieve a high accuracy of a position estimate for terminal 3 at the location of the pre-defined locations, to have a large dynamic range of the RSS values at the location then there is also a high likelihood that a large variety exists among the RSS values, so that this variety of RSS values is characteristic/unique for the location. Accuracy of the position estimate for terminal 3 thus may depend on having at each location of the pre-defined locations a set of RSS values as unique as possible. If the dynamic range of the RSS values is small, all the beacons 20 may have more-or-less the same RSS values and thus there may be no unique characteristics. In particular, if the dynamic range of the RSS values is zero (all beacons 20 with the same RSS values), the location of the pre-defined locations has a low probability of having a unique RSS value characteristics. On the other hand, when the beacons 20 observable at the location have widely varying RSS values, then that set of RSS values has a high probability of being unique. The characteristic (b) described above thus constitutes a comparably simple way of checking—based on the dynamic range of the RSS values—if a location of the pre-defined locations has a high likelihood of exhibiting a unique characteristic and thus allows for accurately estimating the position of a terminal 3.

(c) Respective arrangements of one or more respective beacons respectively observable at a plurality of pre-defined locations in the area with respect to the respective pre-defined location. The one or more respective beacons may for instance be all beacons respectively observable at the plurality of pre-defined locations, or a sub-group thereof having a pre-defined property (e.g. an RSS value for the respective pre-defined location that is larger than or larger-than-or-equal-to a pre-defined threshold). The arrangement of beacons with respect to the pre-defined location may have a significant effect on the accuracy of an estimate of a position of a terminal located at this pre-defined location.

(d) Respective distances between beacons of the beacons 20 and other beacons of the beacons 20. The inter-beacons distances may for instance be inspected to determine if the density of the beacons 20 is acceptable.

Therein, also combinations of these metrics (a) to (d) may be considered by the at least one characteristic. The at least one characteristic may for instance consider the number of beacons 20 observable at a pre-defined location (metric (a)) as well as the dynamic range across their associated RSS values (metric (b)) and the arrangement of these beacons 20 with respect to the pre-defined location (metric (c)), to name but an example.

In example embodiments of the invention, the at least one characteristic may for instance comprise one or more of the following characteristics:

A first characteristic is a set of respective numbers of all respective one or more beacons 20 respectively observable at a plurality of pre-defined locations in the area or of a sub-group of these all respective one or more beacons 20. The first characteristic is for instance considered at least partially insufficient if one or more of the numbers of the set is smaller than or equal-to-or-smaller-than a predefined threshold. A number of the set of numbers may thus pertain to one of the pre-defined locations and may indicate the number of beacons 20 observable at this pre-defined location, or a sub-group thereof, e.g. only those beacons 20 observable at this pre-defined location having at least one pre-defined property, e.g. having RSS values at the respective pre-defined location that are smaller than or smaller-than-or-equal-to a pre-defined threshold. The set of numbers may thus for instance indicate, how many beacons 20 (or beacons 20 with a pre-defined property) are observable at each of the plurality of pre-defined locations (e.g. grid positions of a pre-defined grid laid over the area where the beacons 20 are deployed). If one or more of the numbers of the set of numbers are smaller than or smaller-than-or-equal-to a pre-defined threshold (e.g. 1, 2 or 3, to name but a few examples), it may be considered that this characteristic of the deployment of the beacons 20 in the area is at least partially insufficient. The first information may then for instance comprise an indication that at least at one pre-defined location, the minimum desired number of observable beacons is not met, and/or may identify the one or more pre-defined locations where the minimum desired number of observable beacons is not met. This first information may thus for instance be used to identify where additional beacons 20 have to be deployed in the area to improve the accuracy of the positioning of terminals 3.

A second characteristic is a set of respective properties (e.g. a dynamic range, or a property of a statistical distribution) of respective signal strengths with which one or more respective beacons 20 are respectively observable at a plurality of pre-defined locations in the area. The second characteristic is for instance considered at least partially insufficient if one or more of the properties of the set of properties are in pre-defined relation (e.g. smaller, smaller-than-or-equal, larger, or larger-than-or-equal) with respect to a pre-defined threshold. The second characteristic may thus for instance be indicative of the dynamic range of RSS values (across the respectively observable beacons 20) at each of the pre-defined locations, so that it can be identified at which pre-defined location a dynamic range of the RSS values is insufficient.

A third characteristic is a set of respective measures related to a respective arrangement of one or more (e.g. all, or a subgroup thereof having at least one pre-defined characteristic) respective beacons observable at a plurality of pre-defined locations in the area with respect to the respective pre-defined location. The third characteristic may for instance be considered at least partially insufficient if one or more of the measures of the set are in a pre-defined relation (e.g. smaller, smaller-than-or-equal, larger or larger-than-or-equal) with respect to a pre-defined threshold. The arrangement of beacons with respect to a pre-defined location has a significant impact on the accuracy of an estimate of a position of a terminal 3 that is located at this pre-defined location, so that it is advantageous to check if the respective arrangement of beacons at the plurality of pre-defined locations is satisfactory in this respect.

A fourth characteristic is a set of respective distances between all beacons of the beacons and their respectively closest neighboring beacon of the beacons. The fourth characteristic is for instance considered at least partially insufficient if one or more of the distances are larger or equal-to-or-larger-than a pre-defined threshold. Too large distances between too immediate neighbors among the beacons 20 may be indicative of a poor accuracy of positioning in the vicinity of these beacons 20.

With respect to the third characteristic discussed above, the measure related to an arrangement of one or more beacons observable at a pre-defined location may for instance be a dilution-of-precision metric (which are for instance known to a person skilled in the art from satellite-based navigation systems). An example for the measure may for instance be a measure related to (e.g. as the reciprocal value of) the size or normalized size of the line segment, area or volume spanned by the tips of respective units vectors originating in the pre-defined location and having a direction that is determined by the respective position of the one or more beacons. A further example for the measure may be a measure related to (e.g. equaling) the trace of the inverse of the matrix product $H^T \cdot H$, where T denotes transposition and H is an N×M matrix (e.g. a direction cosine matrix) that contains in each row an m-dimensional unit vector (e.g. m=2 in case of a two-dimensional unit vector and m=3 in case of a three-dimensional unit vector) originating in the pre-defined location and pointing towards the beacon n with n ranging from 1 to N and N denoting the number of beacons observable at the pre-defined location.

An even further example for the measure related to an arrangement of one or more beacons observable at a pre-defined location may for instance be the minimum angle from a set of angles, wherein each angle of the set of angles relates to a different pair of beacons of the one or more beacons observable at the pre-defined location, wherein for each possible pair of beacons of the one or more beacons observable at the pre-defined location, a respective angle is comprised in the set of angles and is defined as the absolute value of the difference between the smaller angle between a first vector originating in the pre-defined location and pointing towards a position of a beacon of the pair of beacons and a second vector originating in the pre-defined location and pointing towards a position of the other beacon of the pair of beacons and 90°.

In the third characteristic, it is then checked if these minimum angles for each pre-defined position are larger than or larger-than-or-equal-to a pre-defined threshold (e.g. 30° or 45°). Those angles that are larger or larger-than-or-equal-to the pre-defined threshold are then indicative of arrangement of beacons that do not allow for an accurate positioning of a terminal 3 at the pre-defined location.

Figure 3:
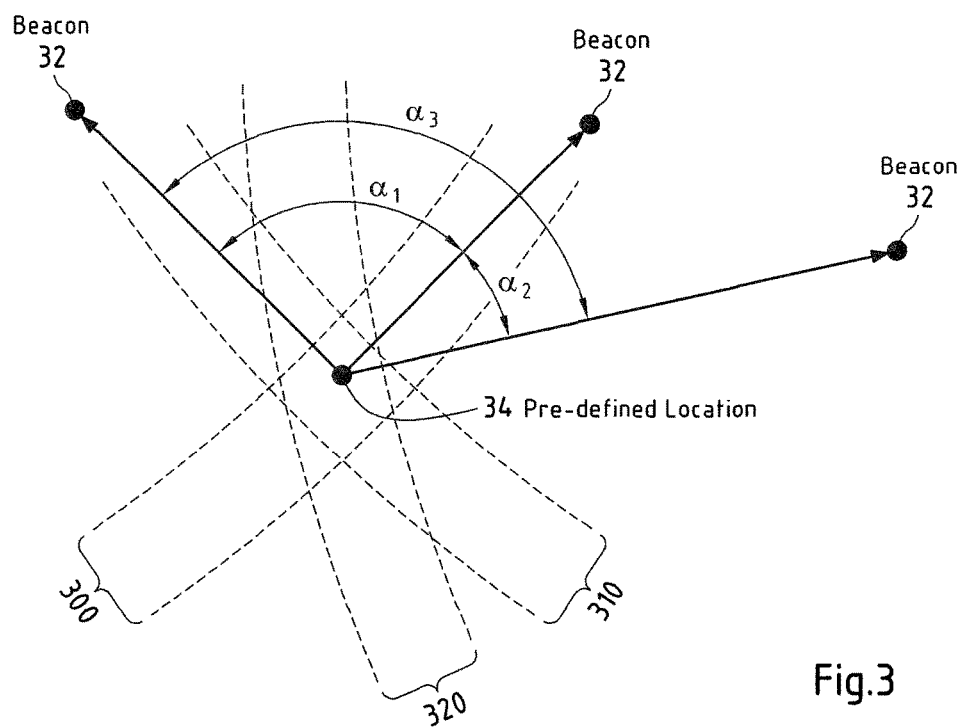
FIG. 3 is a schematic illustration of an arrangement of beacons with respect to a pre-defined location.

FIG. 3 is a schematic illustration of an arrangement of beacons 30, 31 and 32 with respect to a pre-defined location 34 (as a representative of a plurality of pre-defined locations of e.g. a regular grid). The pre-defined location 34 is connected with respective vectors pointing towards the respective positions of beacons 30, 31 and 32. Furthermore, for each possible pair of beacons, the smaller angle between the respective vectors of these beacons is shown. The pair of beacon 30 and 31 is associated with angle $\alpha_1$, the pair of beacon 30 and 32 is associated with angle $\alpha_3$, and the pair of beacon 31 and 32 is associated with angle $\alpha_2$. The set of angles for the pre-defined location 34 would then comprise the absolute values of the difference of each of these angles and 90°, i.e. $\{|\alpha_1-90°|, \{|\alpha_2-90°|, \{|\alpha_3-90|\}$. Since $\alpha_1$, in this example, would be closest to 90°, the minimum of these set elements (or angles) would be the first set element, and this set element would be considered as the measure related to the arrangement of beacons 30, 31 and 32 observable at pre-defined location 34. In the present case, this measure is close to 0°, which indicates that there is at least one pair of beacons (here: beacons 30 and 31) that is, with respect to the pre-defined location 34, arranged in a close-to-perpendicular fashion. Assuming that the portion of a coverage area of a beacon where the same RSS values are measured can be represented by bands, as exemplarily shown for beacon 30 with band 300, for beacon 31 with band 310 and for beacon 32 with band 320, it can be seen that the intersection area of such bands (where the position estimate of a terminal 3 is expected) is much smaller if the beacons are perpendicular to each other (see the intersection of bands 300 and 310, which is much smaller than the intersection of bands 310 and 320).

In example embodiments of the invention, a coverage map (e.g. a radiomap) is used to detect the number of observable beacons (e.g. their density) at any given location in the area to which the coverage map pertains; the distribution of the beacon signal strengths at any given location in the area to which the coverage map pertains; the geometry of the beacons at any given location in the area to which the coverage map pertains; and/or beacon locations (e.g. by searching for the location of the highest received signal strength.) The underlying idea in these example embodiments of the invention is that the positioning infrastructure analysis can be produced as a by-product of actions that will anyhow need to be done during the indoor positioning system deployment process. I.e. all the information about the beacon deployment quality can be captured from the coverage map that is created during the deployment process. Also, it can be detected, if in some areas the beacon density is dangerously low (jeopardizing the positioning performance) and thus more beacons are needed in the area.

In example embodiments of the invention, the coverage map analysis may for instance be relatively straightforward: The coverage map (e.g. pertaining to a building) is analyzed, e.g. at a one-meter mesh, and at every mesh point, one or more (e.g. all) of the following characteristics are checked:

The number of beacons observable at the point (e.g. the density).

The dynamic range of received signal strengths.

Beacon locations, e.g. by finding the most probable location of the highest received signal strength for a given beacon.

The geometry of beacons observable at the point. This can be evaluated with the help of Dilution-of-Precision metrics (DOP), which is calculated from the unit vectors from the evaluation point to the beacon locations. E.g. the lower the DOP value, the better geometrical distribution the beacons have.

The inter-beacon distance. The optimal beacon deployment may for instance be such that the beacons are installed in a roughly rectangular grid with 8 to 10 meter grid size.

For instance, if any of the above values is not at a desired level at some area, it may be concluded that more beacons need to be installed at the vicinity of that particular location. After this, a coverage map re-survey (e.g. a re-determining or update) is performed and coverage map analysis (as described above) may then be re-run. The results of the coverage map analysis can for instance be visualized on a floor plan. On a floor plan, then the areas, in which further beacons need to be deployed and the primary reason for the need, may be displayed.

Figure 4:
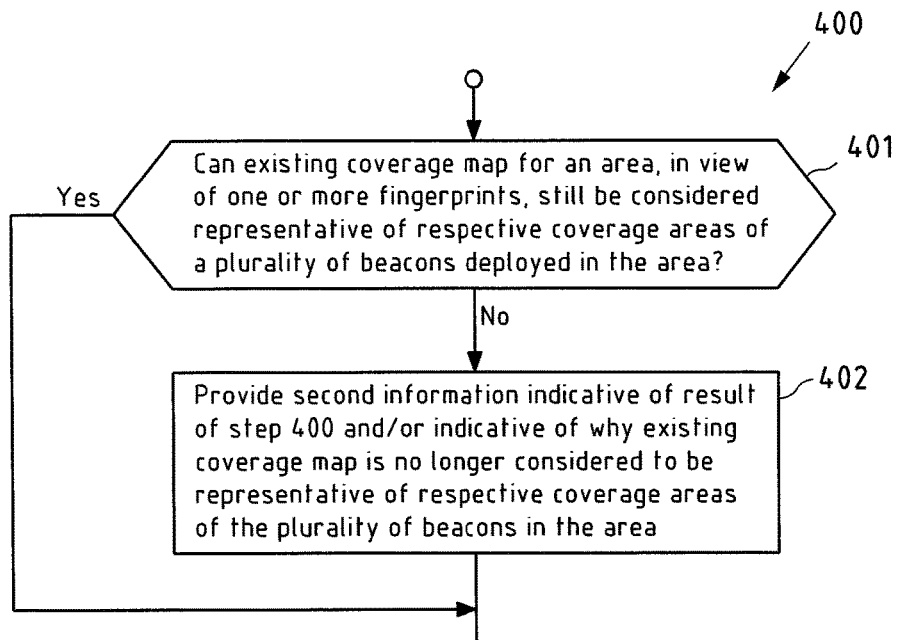
FIGS. 4-6 are flow charts illustrating further example embodiments of a method according to the first aspect of the invention.

FIG. 4 is a flow chart 400 illustrating an example embodiment of a method according to the first aspect of the invention, in particular with respect to its alternative (ii) described above.

In a step 401, it is determined, at least based on one or more fingerprints provided by one or more terminals 3, whether or not an existing coverage map for an area can still be considered to be representative of respective coverage areas of a plurality of beacons 20 deployed in the area. This determining may for instance be based on one or more pre-defined rules specifying in which cases an existing coverage map can still be considered to be representative of respective coverage areas of a plurality of beacons 20 and in which cases not.

The one or more fingerprints may for instance be received by analysis server 7 from positioning server 4. The one or more fingerprints may for instance be fingerprints that have been flagged by positioning server 4 as erroneous or at least potentially erroneous, for instance since they refer to one or more unknown beacons, or do not lead to a consistent position estimate (e.g. because only three of the four coverage areas of beacons that were observed by the terminal 3 that provided the fingerprint have a common intersection, but not all four), and have then been provided to analysis server 7. For instance, only such flagged fingerprints may be provided to analysis server 7. Alternatively, the one or more fingerprint may be provided by positioning server 4 to analysis server 7 without pre-processing by positioning server 4. For instance, positioning server 4 may be configured to relay a certain percentage of all fingerprints received from terminals 3 to analysis server, e.g. each $10^{th}$, $50^{th}$ or $100^{th}$ fingerprint. As a further alternative, the one or more fingerprints may be received by analysis server 7 without passing through positioning server 4 (e.g. from terminals 3 via an at least partially wireless connection that may involve further infrastructure, e.g. of a cellular communication system and/or a Wi-Fi system). The determining of step 401 may for instance not be based on any information (e.g. uncertainty or error information) derived by an entity different from analysis server 7 (e.g. by positioning server 4, or by a terminal 3 that provided the respective fingerprint) from the one or more fingerprints. Nevertheless, in all scenarios mentioned in this paragraph, the one or more fingerprints may be fingerprints that are provided by terminals 3 in order to obtain a position estimate from positioning server 4 and/or by terminals 3 that are not equipped with a GNSS sensor and are thus not able to estimate their position on their own. The analysis server 7 may thus only analyze fingerprints that were also processed by positioning server 4 to determine a position estimate for the respective terminals 3 that provided the fingerprints.

If step 401 yields a positive result, step 402 is performed by providing second information indicative of the result of step 400 and/or indicative of why the existing coverage map is no longer considered to be representative of the respective coverage areas of the plurality of beacons 20 deployed in the area. The second information may thus merely indicate that the existing coverage map is outdated. The second information may then for instance be represented by a trigger signal (e.g. from analysis server 7 of FIG. 1 to coverage map generation/update server 6) that causes an updating or re-determining of the coverage map for the area. Additionally or alternatively, the second information may contain further details why the existing coverage map is considered to be outdated, e.g. by indicating which portions (e.g. which coverage areas of beacons) are considered to be outdated.

The updating or re-determining of the coverage map for the area may for instance not be or at least not be entirely based on crowd-sourcing. Instead, the fingerprints may be provided by one or more probe terminals (e.g. a robotic devices) that approach a plurality of pre-defined locations in the area in a planned manner. This may lead to a more accurate coverage map than compared to the case of crowd-sourcing.

The updating or re-determining of the coverage map may for instance not be triggered for any detected deviation of fingerprint information from the existing coverage map, but only for larger deviations, e.g. in case that pre-defined thresholds have been exceeded as will be described below.

The process of estimating positions of terminals 3 based on fingerprints provided by terminals 3 (as performed by positioning server 3) may for instance be separate from the process of analyzing at least some of these fingerprints (as performed by analysis server 7) to detect whether or not an existing coverage map is still representative of the respective coverage areas of the beacons 20 deployed in the area or not. Nevertheless, the same fingerprints may be used in both processes.

In the determining of step 401, one or more of the following may for instance be considered:

A deviation of a (e.g. current or average) strength of a respective signal received from a beacon 2 by at least one terminal 3 at an estimated position in the area from a value indicated by the existing coverage map for this position and beacon 2 (e.g. a deviation that is larger than or larger-than-or-equal-to a pre-defined threshold). The estimated position of the at least one terminal 3 may for instance be determined (e.g. by positioning server 4 or by analysis server 7) based on information on other beacons 2 comprised in the fingerprint, i.e. beacons 2 that are different from the beacon 2 for which the deviation of the RSS value is detected.

At least one beacon 2 in the area that has been observed by one or more terminals 3 but is not yet represented in the existing coverage map. This indicates that a new beacon 2 has been deployed in the area.

At least one beacon 2 represented in the existing coverage map by a coverage area 20 but which is not observed by one or more terminals 3 at respective estimated positions within the coverage area 20. This indicates that a beacon 2 has been removed or is out of order. The respective estimated positions of the one or more terminals 3 may for instance be determined (e.g. by positioning server 4 or by analysis server 7) based on information on other beacons 2 comprised in the one or more fingerprints, i.e. beacons 2 that are different from the at least one beacon 2 represented in the existing coverage map but not observed by one or more terminals 3.

At least one beacon 2 represented in the existing coverage map by a coverage area 20 but which is observed by one or more terminals 3 at respective estimated positions outside the coverage area 20. This indicates that a beacon 2 has moved. The respective estimated positions of the one or more terminals 3 may for instance be determined (e.g. by positioning server 4 or by analysis server 7) based on information on other beacons 2 comprised in the one or more fingerprints, i.e. beacons 2 that are different from the at least one beacon 2 represented in the existing coverage map but which is observed by one or more terminals 3 outside the overage area 20.

In step 401, it may for instance be determined that the existing coverage map is no longer considered to be representative of respective coverage areas of the plurality of beacons deployed in the area in one or more of the following cases:

A number of beacons 2, for any of which in at least a pre-defined number of instances, a deviation of a strength of a respective signal received from the beacon by a respective terminal 3 at a respective estimated position in the area from a value indicated by the existing coverage map for this respective position and beacon 2 is larger than or larger-than-or-equal-to a pre-defined threshold, is larger than or larger-than-or-equal-to a pre-defined threshold. The pre-defined number of instances may for instance be 1 or larger. The pre-defined threshold for the number of beacons 2 may for instance be 1 or larger. It may for instance be determined under consideration of the total number of beacons deployed in the area or represented in the coverage map. The pre-defined threshold for the deviation of the RSS from the value indicated by the existing coverage map may for instance be fixed under consideration of a standard deviation of the value indicated by the existing coverage map so that only statistically significant deviations are considered.

A number of beacons 2, each of which has been observed by one or more respective terminals 3 but is not yet represented in the existing coverage map (e.g. with at least identifier and RSS information for one or more pre-defined locations), is larger than or larger-than-or-equal-to a pre-defined threshold. The pre-defined threshold may for instance be 1 or larger. It may for instance be determined under consideration of the total number of beacons deployed in the area or represented in the coverage map.

A number of beacons 2, each of which is represented in the existing coverage map by a respective coverage area but is not observed by one or more respective terminals 3 at respective estimated positions within the respective coverage area, is larger than or larger-than-or-equal-to a pre-defined threshold. The pre-defined threshold may for instance be 1 or larger. It may for instance be determined under consideration of the total number of beacons deployed in the area or represented in the coverage map.

A number of beacons 2, each of which is represented in the existing coverage map by a respective coverage area but is observed by one or more terminals 3 at respective estimated positions outside the respective coverage area, is larger than or larger-than-or-equal-to a pre-defined threshold. The pre-defined threshold may for instance be 1 or larger. It may for instance be determined under consideration of the total number of beacons 2 deployed in the area or represented in the coverage map.

In example embodiments of the invention, as described above, statistics probes are collected from the terminals 3 (as users of the positioning service) about the discrepancies between a coverage map for an area (e.g. the current understanding of the radio environment in case of a radiomap) and the observations (the fingerprints made for positioning purposes by the terminals 3).

For instance, evidence from multiple terminals 3 is collected over a time window about discrepancies at a location or area. Discrepancies maybe, for instance, large signal strength deviations, evidence of moved beacons, evidence of missing/disappeared beacons and/or evidence of new beacons.

A record may for instance be kept (e.g. by the analysis server 7) of one or more of the following items based on the statistics information from the terminals 3:

Location-based information about the number of observed beacons not in the coverage map.

Location-based information about the number of beacons that are in the coverage map but are not detected at that location.

Location-based information about big discrepancies between the observed beacon signal strength and modeled signal strength in the coverage map.

Location-based information about potentially moved beacons.

For instance, if any of these statistics is above a threshold at some location over a time window (e.g. a window of pre-defined length), an alert is given about the re-survey of the coverage map need. If not, another time window may for instance be entered. In this way, the re-survey of the coverage map may for instance only take place in larger intervals only (e.g. in terms of days or weeks), and not continuously. Also, in case of missing beacons, a notification to check the beacon status, may be given. The management system (e.g. as part of analysis server 7) may provide an option to set such alarms and send e.g. email, SMS or other messages when the trigger fires.

The statistics collected can also reveal, if some beacons have totally disappeared. In case of Bluetooth Low Energy (BLE) beacons, this may imply that the battery has died or that the beacon has been stolen. As the coverage map analysis may have produced the beacon locations as a by-product, it is easy to find the malfunctioning beacons even if the beacon locations would not have been recorded during the deployment phase (which is a typical case).

Figure 5:
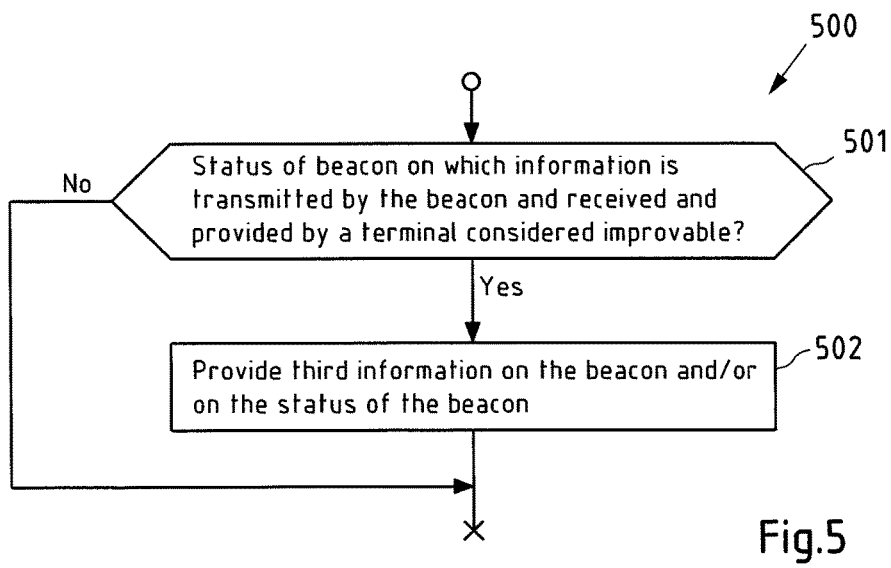

FIG. 5 is a flow chart 500 illustrating an example embodiment of a method according to the first aspect of the invention, in particular with respect to its alternative (iii) described above.

In flow chart 500, in a step 501, it is determined whether or not a status of a beacon on which information is transmitted by the beacon and received and provided by a terminal 3 is considered improvable. The determining of step 501 may for instance be based on one or more pre-defined rules specifying in which case a status of a beacon is considered improvable.

If step 501 yields a positive result, third information on the beacon and/or on the status of the beacon is provided in step 502. Otherwise, the flowchart terminates.

Information on the status of a beacon 2 is transmitted by the beacon 2, for instance together in a signal by which the beacon 2 broadcasts its identity. A message in which a beacon broadcasts status information may be understood as a telemetry message, since it contains measurement data of beacon 2 on its status. The information on the status of the beacon 2 is then received by a terminal 3. Terminal 3 then provides this information, e.g. by transmitting it towards positioning server 4 or analysis server 7 or towards another entity. For instance, respective information on the status of one or more beacons 2 may be included in a fingerprint provided by terminal 3 for positioning purposes, in particular towards positioning server 4 or analysis server 7. For instance, a fingerprint may thus comprise, for each beacon 2 observable at a current position of a terminal 3, an identifier of the beacon 2, status information on the beacon 2, and/or an RSS value for this beacon 2. To reduce communication overhead, status information may however not be provided with each fingerprint, even if status information for a beacon whose identifier is included in a fingerprint is available at terminal 3. For instance, a frequency of including an identifier of a beacon observable at a position of terminal 3 into fingerprints provided by terminal 3 may be higher than a frequency of including status information for this beacon 2 into fingerprints provided by terminal 3. For instance, terminal 3 may analyze status information received from a beacon and may provide status information from this beacon only (e.g. in a fingerprint) if a change occurred in the status of the beacon or if a change occurred that is larger than or larger-than-or-equal-to a pre-defined threshold. Alternatively, the status information may not be provided by terminal 3 in a fingerprint. Terminal 3 may for instance use another type of message to provide the status information to another entity, e.g. to positioning server 4 or analysis server 7. This message may for instance not trigger positioning of terminal 3, and/or may not comprise RSS information for the beacon 2 on which status information is provided. An identifier of the beacon 2 on which status information is provided may however be included to allow identification of the beacon 2. Such a message may for instance only be provided by terminal 3 (e.g. to positioning server 4 or analysis server 7) if terminal 3 determines that a change of status of beacon 2 occurred that has not yet been reported.

Equally well, a frequency of providing status information by a beacon 2 may be lower than a frequency of providing an identifier of the beacon 2 by the beacon 2. The beacon may thus not always broadcast its status together with its identifier, but e.g. only if a change (or a change that is larger than or larger-than-or-equal-to a pre-defined threshold) of the status occurred. This may save power at the beacon, which is particularly advantageous if the beacon is battery-powered. If the beacon's status information broadcast frequency is lower than the beacon's identifier broadcast frequency as discussed before, the terminal providing the status information may for instance be configured to provide any status information received from a beacon, e.g. immediately upon reception (e.g. with a message that is not a fingerprint), or e.g. with the next fingerprint sent by terminal 3 to trigger positioning of the terminal 3.

The status of the beacon 2 may for instance be related to a power source of the beacon, in particular to a battery (that may be rechargeable or not) thereof. Additionally or alternatively, the status may pertain to a firmware or software version of beacon 2, or to broadcast-related characteristics, such as for instance a frequency or frequency channel on which the beacon broadcasts.

In example embodiments of the present invention, as described above, beacon telemetry packets are captured in the terminals 3 and routed towards a management system (e.g. positioning server 4 or analysis server 7). The telemetry packet may contain information e.g. on the beacon's battery status. Capturing this by the terminals 3 means that there is no need for special hardware to be deployed on the site to capture the telemetry information. This eases up the deployment effort significantly.

Moreover, collecting the telemetry data via the terminals 3 as users of the positioning service (provided by positioning server 4) means that real-time information about the infrastructure health is available all the time. Most typically, telemetry information from BLE beacons is collected by installing specialized hardware in the premises to collect the telemetry packets from the BLE beacons. However, collecting the telemetry data via the terminals 3 as users of the positioning service according to embodiments of the present invention is a preferred method, because no extra hardware needs to be set up. The only requirement is that there is an adequate number of terminals 3 so that telemetry information gets collected reliably all the time.

The telemetry information collected by the terminals 3 is for instance captured by a software in the terminals 3, sent to the coverage map monitoring backend (e.g. to analysis server 7, e.g. via positioning server 4), analyzed and visualized on the management system's user interface (e.g. the analysis server's user interface). Alternatively, an alarm notification may be sent to a system operator, e.g. based on the conditions set for the alarms.

Telemetry messages contain information e.g. on the battery levels of the beacons 2. The infrastructure monitoring allows changing the batteries at the right time—not too early, but early enough before the beacon battery dies.

Figure 6:
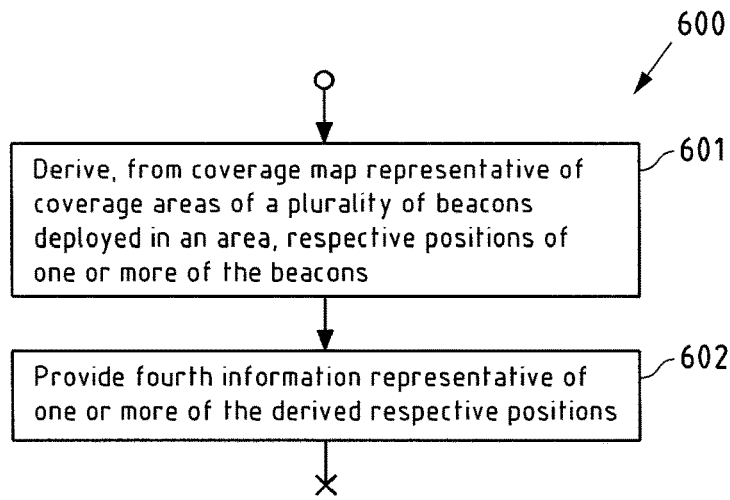

FIG. 6 is a flow chart 600 illustrating an example embodiment of a method according to the first aspect of the invention, in particular with respect to its alternative (iv) described above.

In a step 601, from a coverage map that is representative (e.g. in terms of models, or by grid points with associated beacon identifiers and RSS values) of respective coverage areas of a plurality of beacons deployed in an area, respective positions of one or more of the beacons are derived.

In a step 602, then fourth information representative of one or more of the derived respective positions of the one or more beacons is provided.

The respective position of at least one (or e.g. all) of the one or more beacons may for instance respectively be determined as the position where the coverage map indicates a maximum value of a strength of a signal received from the beacon (a maximum RSS value). If the maximum RSS value for a beacon occurs at several positions, the position of the beacon may for instance be determined as the center of a line, area or volume defined by these positions.

Alternatively, the respective position of at least one (or e.g. all) of the one or more beacons may for instance respectively be determined by calculating an average value over locations representing a coverage area of the beacon, wherein these locations are weighted (in the determination of the average value) with the respective RSS values associated with these locations and with the beacon. If the coverage map is for instance based on grid points with associated beacon identifiers and RSS values, the position of a beacon may thus be calculated by determining an average of the positions of those grid points that are associated with a beacon identifier identifying the beacon, wherein these grid points are weighted with the RSS values that pertain to these respective grid points and to the beacon).

In example embodiments of the present invention, the first information (see step 203 of FIG. 2), second information (see step 402 of FIG. 4), third information (see step 502 of FIG. 5) and/or fourth information (see step 602 of FIG. 6) is provided by displaying it or a representation thereof on a display, for instance a display of analysis server 7 or of analysis client 8 (or on a single analysis apparatus as described above). Which information is displayed may for instance depend on which of alternatives (i) to (iv) of the method according to the first aspect of the invention have been performed.

The first, second, third and/or fourth information or the representation thereof may for instance at least partially be displayed together and/or aligned with a map or plan of the area (in which the beacons 2 are deployed).

For instance, at least for those one or more beacons 2, to which the first information, the second information and/or the third information respectively pertains, information representative of their derived positions is provided.

In example embodiments of the present invention, for instance one or more of the following may thus be indicated on a user interface (e.g. of analysis server 7 or of analysis client 8 (or on a single analysis apparatus as described above), wherein the user interface can for instance be a web user interface):

Beacon locations

Locations at which the beacon density is not sufficient (this indicates to an operator that beacons should be added at the location)

Locations in which the signal strength dynamics is not sufficient (this indicates to an operator that beacons should be added at the location)

Locations in which the geometry/arrangement of beacons is not good (this indicates to an operator that beacons should be added and/or rearranged at the location)

Locations at which the coverage map has changed significantly based on the evidence from the terminals 3 (this indicates to an operator that a re-survey of the coverage map should be performed at least at these locations)

In case telemetry data shows that a beacon battery is about to die, indicating this on the user interface, so that the battery or beacon gets replaced in time before the beacon gets out-of-service totally.

Example embodiments of the present invention thus provide an automated mechanism to analyze the coverage map quality and the positioning infrastructure health status. Automated indications about the need for further infrastructure deployment, about the coverage map re-survey needs and about the infrastructure health are provided.

Figure 7:
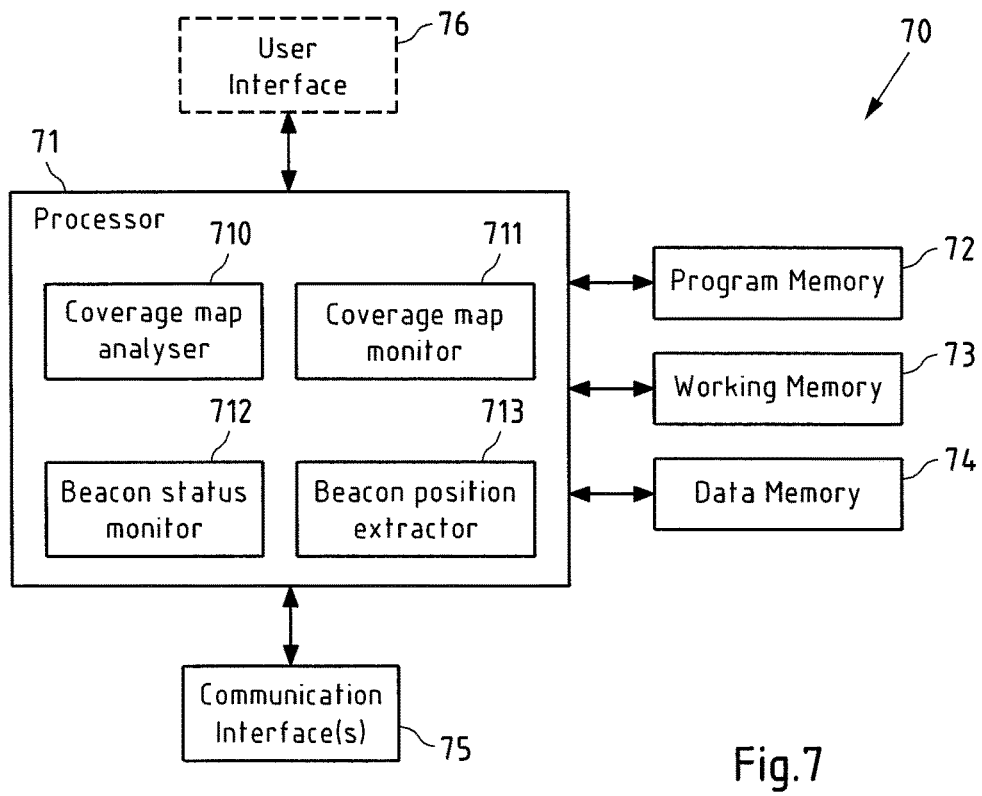
FIG. 7 is a block diagram of an example embodiment of an apparatus according to the invention.

FIG. 7 is a schematic block diagram of an example embodiment of an apparatus 70 according to the invention. Apparatus 70 may for instance represent at least a part (e.g. a functional unit or module) of the analysis server 7 (see FIG. 1), or of an analysis apparatus that combines analysis server 7 and analysis client 8.

Apparatus 70 comprises at least one processor 71 and at least one program memory 72 including computer program code, the at least one program memory 72 and the computer program code configured to, with the at least one processor 71, cause an apparatus (for instance apparatus 70, or another apparatus that comprises apparatus 70) at least to perform the method according to the first aspect of the present invention. Processor 71 for instance executes the computer program code stored in program memory 72. Processor 71 for instance accesses program memory 72 via a bus. The computer program code stored in program memory 72 is an example of a computer program code according to the respective aspect of the present invention, i.e. a computer program code that when executed by processor 71 causes apparatus 70 (or an apparatus that comprises apparatus 70) to perform the actions of the method according to the first aspect of the invention.

Apparatus 70 is also an example embodiment of an apparatus that is configured to perform and/or control or comprises components for performing and/or controlling the method according to the first aspect of the present invention. The processor 71 of apparatus 70 comprises a coverage map analyser 710, a coverage map monitor 711, a beacon status monitor 712 and a beacon position extractor 713. Coverage map analyser 710 may for instance be configured to at least perform steps 201 and 202 of FIG. 2. Coverage map monitor 711 may for instance be configured to at least perform step 401 of FIG. 4. Beacon status monitor 712 may for instance be configured to at least perform step 501 of FIG. 5. Beacon position extractor 713 may for instance be configured to at least perform step 601 of FIG. 6. Coverage map analyser 710, coverage map monitor 711, beacon status monitor 712 and/or beacon position extractor 713 may be separate components (e.g. sub-processors or cores) of processor 71 or may be combined in a single component of processor 71.

Program memory 72 may also be included into processor 71. This memory may for instance be fixedly connected to processor 71, or be at least partially removable from processor 71, for instance in the form of a memory card or stick. Program memory 72 may also comprise an operating system for processor 71. Program memory 72 may also comprise a firmware for apparatus 70. Program memory 72 may for instance comprise a first memory portion that is fixedly installed in apparatus 70, and a second memory portion that is removable from apparatus 70, for instance in the form of a removable SD memory card.

Apparatus 70 further comprises data memory 74. Processor 71 for instance accesses data memory 74 via a bus. Data memory 74 may also be included into processor 71. Data memory 74 may for instance be fixedly connected to processor 71, or be at least partially removable from processor 71, for instance in the form of a memory card or stick. Data memory 74 may for instance comprise rules and/or pre-defined thresholds for the determining steps 202 (FIG. 2), 401 (FIG. 4), 501 (FIG. 5) and/or 601 (FIG. 6), and/or configuration information, for instance for different kinds of alerts. Data memory 74 may also store the coverage map or a part thereof, e.g. as local copy of the coverage map stored by coverage map storage 5 of FIG. 1, or function as a substitute of coverage map storage 5. Data memory 74 may for instance comprise a first memory portion that is fixedly installed in apparatus 70, and a second memory portion that is removable from apparatus 70, for instance in the form of a removable SD memory card.

Program memory 72 and/or data memory 74 may for instance be a non-volatile memory. It may for instance be a FLASH memory (or a part thereof), any of a ROM, Programmable ROM (PROM), Erasable PROM (EPROM), Electrically Erasable PROM (EEPROM), Magnetoresistive Random Access Memory (MRAM) or a Ferroelectric Random Access Memory (FeRAM) memory (or a part thereof) or a hard disc (or a part thereof), to name but a few examples.

In the apparatus 70, processor 71 interfaces with a working memory 73, for instance in the form of a volatile memory. It may for instance be a Random Access Memory (RAM) or Dynamic RAM (DRAM), to give but a few non-limiting examples. It may for instance be used by processor 71 when executing an operating system and/or computer program code.

Processor 71 further controls a communication interface 75 configured to receive and/or output data and/or information. For instance, communication interface 75 may be configured to communicate with one or more (e.g. remote) devices, e.g. with positioning server 4 (see FIG. 1), with coverage map storage 5, with coverage map generation/update server 6, with analysis client 8 (if present) and/or with one or more of terminals 3. This may for instance comprise receiving information (such as fingerprints or information derived from fingerprints) from such devices and/or transmitting information (e.g. trigger signals for causing a re-generation or updating of at least a part of the coverage map to server 6, or first/second/third/fourth information to analysis client 7) to such devices. The communication may for instance be wire-bound, or may at least partially (or entirely) be based on a wireless communication connection.

Processor 71 (and also any other processor mentioned in this specification) may be a processor of any suitable type. Processor 71 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 71 may for instance be an application processor that runs an operating system.

Some or all of the components of the apparatus 70 may for instance be connected via a bus. Some or all of the components of the apparatus 70 may for instance be combined into one or more modules.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program code) may also be used in a corresponding manner in an example embodiment of any other category. It should also be understood that presence of a feature in the presented example embodiments shall not necessarily mean that this feature forms an essential feature of the invention and cannot be omitted or substituted.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. An apparatus comprising at least one processor and at least one memory including computer program code, the at least one memory and the computer program code configured to, with the at least one processor, cause an apparatus at least to perform and/or control:
    a first determining whether or not at least one characteristic that has been derived from a coverage map being representative of respective coverage areas of a plurality of beacons deployed in an area is affected at least by a count of the beacons deployed in the area and to their respective positions and affects an accuracy of a positioning of one or more terminals located in the area that is at least based on the coverage map and on respective fingerprints provided by the one or more terminals, is considered at least partially insufficient, and a providing, in case the first determining has come to an affirmative result, of first information on the at least one characteristic considered at least partially insufficient and/or on instances that at least contributed to the at least one characteristic being considered at least partially insufficient;
    a second determining, at least based on one or more fingerprints provided by one or more terminals, whether or not an existing coverage map for an area can still be considered to be representative of respective coverage areas of a plurality of beacons deployed in the area, and a providing, in case the second determining has come to an affirmative result, of second information indicative of the result and/or indicative of why the existing coverage map is no longer considered to be representative of the respective coverage areas of the plurality of beacons deployed in the area;
    a third determining whether or not a status of a beacon on which information is transmitted by the beacon and received and provided by a terminal is considered improvable, and a providing, in case the third determining has come to an affirmative result, of third information on the beacon and/or on the status of the beacon; and
    a deriving, from a coverage map that is representative of respective coverage areas of a plurality of beacons deployed in an area, of respective positions of one or more of the beacons, and a providing of fourth information representative of one or more of the derived respective positions of the one or more beacons.

2. The apparatus according to claim 1, wherein the at least one memory and the computer program code are configured to, with the at least one processor, cause the apparatus at least to perform and/or control the first determining and the providing of the first information, and wherein at least one of the at least one characteristic considers at least one or more of the following:
    respective numbers of all respective one or more beacons respectively observable at a plurality of pre-defined locations in the area or of a subgroup of these all respective one or more beacons;
    at least one characteristic of respective signal strengths with which one or more respective beacons are respectively observable at a plurality of pre-defined locations in the area;
    respective arrangements of one or more respective beacons respectively observable at a plurality of pre-defined locations in the area with respect to the respective pre-defined location;
    respective distances between beacons of the beacons and other beacons of the beacons.

3. The apparatus according to claim 1, wherein the at least one memory and the computer program code are configured to, with the at least one processor, cause the apparatus at least to perform and/or control the first determining and the providing of the first information, and wherein the at least one characteristic comprises one or more of the following:
    a first characteristic that is a set of respective numbers of all respective one or more beacons respectively observable at a plurality of pre-defined locations in the area or of a subgroup of these all respective one or more beacons; the first characteristic being considered at least partially insufficient if one or more of the numbers of the set is smaller than or equal-to-or-smaller-than a predefined threshold;
    a second characteristic that is a set of respective properties of respective signal strengths with which one or more respective beacons are respectively observable at a plurality of pre-defined locations in the area; the second characteristic being considered at least partially insufficient if one or more of the properties of the set of properties are in pre-defined relation with respect to a pre-defined threshold;
    a third characteristic that is a set of respective measures related to a respective arrangement of one or more respective beacons observable at a plurality of pre-defined locations in the area with respect to the respective pre-defined location; the third characteristic being considered at least partially insufficient if one or more of the measures of the set are in a pre-defined relation with respect to a pre-defined threshold;
    a fourth characteristic that is a set of respective distances between all beacons of the beacons and their respectively closest neighboring beacon of the beacons, the fourth characteristic being considered at least partially insufficient if one or more of the distances are larger or equal-to-or-larger-than a pre-defined threshold.

4. The apparatus according to claim 3, wherein the measure related to an arrangement of one or more beacons observable at a pre-defined location is a dilution-of-precision metric, or is related to the size or normalized size of the line segment, area or volume spanned by the tips of respective units vectors originating in the pre-defined location and having a direction that is determined by the respective position of the one or more beacons, or is related to a trace of an inverse of a matrix product $H^T \cdot H$, where T denotes transposition, H is an N×m matrix that contains in each row an m-dimensional unit vector originating in the pre-defined location and pointing towards the beacon n with n ranging from 1 to N and N denoting the number of beacons observable at the pre-defined location.

5. The apparatus according to claim 3, wherein the measure related to an arrangement of one or more beacons observable at a pre-defined location is the minimum angle from a set of angles, wherein each angle of the set of angles relates to a different pair of beacons of the one or more beacons observable at the pre-defined location, wherein for each possible pair of beacons of the one or more beacons observable at the pre-defined location, a respective angle is comprised in the set of angles and is defined as the absolute value of the difference between the smaller angle between a first vector originating in the pre-defined location and pointing towards a position of a beacon of the pair of beacons and a second vector originating in the pre-defined location and pointing towards a position of the other beacon of the pair of beacons and 90°.

6. The apparatus according to claim 1, wherein the at least one memory and the computer program code are configured to, with the at least one processor, cause the apparatus at least to perform and/or control the second determining and the providing of the second information, wherein one or more of the following is considered in the second determining:
  a deviation of a strength of a respective signal received from a beacon by at least one terminal at an estimated position in the area from a value indicated by the existing coverage map for this position and beacon;
  at least one beacon in the area that has been observed by one or more terminals but is not yet represented in the existing coverage map;
  at least one beacon represented in the existing coverage map by a coverage area but which is not observed by one or more terminals at respective estimated positions within the coverage area;
  at least one beacon represented in the existing coverage map by a coverage area but which is observed by one or more terminals at respective estimated positions outside the coverage area.

7. The apparatus according to claim 1, wherein the at least one memory and the computer program code are configured to, with the at least one processor, cause the apparatus at least to perform and/or control the second determining and the providing of the second information, wherein it is determined that the existing coverage map is no longer considered to be representative of respective coverage areas of the plurality of beacons deployed in the area in one or more of the following cases:
  a number of beacons, for any of which in at least a pre-defined number of instances, a deviation of a strength of a respective signal received from the beacon by a respective terminal at a respective estimated position in the area from a value indicated by the existing coverage map for this respective position and beacon is larger than or larger-than-or-equal-to a pre-defined threshold, is larger than or larger-than-or-equal-to a pre-defined threshold;
  a number of beacons, each of which has been observed by one or more respective terminals but is not yet represented in the existing coverage map, is larger than or larger-than-or-equal-to a pre-defined threshold;
  a number of beacons, each of which is represented in the existing coverage map by a respective coverage area but is not observed by one or more respective terminals at respective estimated positions within the respective coverage area, is larger than or larger-than-or-equal-to a pre-defined threshold;
  a number of beacons, each of which is represented in the existing coverage map by a respective coverage area but is observed by one or more terminals at respective estimated positions outside the respective coverage area, is larger than or larger-than-or-equal-to a pre-defined threshold.

8. The apparatus according to claim 1, wherein the at least one memory and the computer program code are configured to, with the at least one processor, cause the apparatus at least to perform and/or control the third determining and the providing of the third information, wherein the status of the beacon is related to a power source of the beacon, in particular to a battery thereof.

9. The apparatus according to claim 1, wherein the at least one memory and the computer program code are configured to, with the at least one processor, cause the apparatus at least to perform and/or control the deriving of the respective positions of the one or more beacons from the coverage map and the providing of the fourth information, wherein the respective position of at least one the one or more beacons is determined as the position where the coverage map indicates a maximum value of a strength of a signal received from the beacon.

10. The apparatus according to claim 1, wherein the first, second, third and/or fourth information is provided by displaying it or a representation thereof on a display.

11. The apparatus according to claim 10, wherein the first, second, third and/or fourth information or the representation thereof is at least partially displayed together and/or aligned with a map or plan of the area.

12. The apparatus according to claim 1, wherein the at least one memory and the computer program code are configured to, with the at least one processor, cause the apparatus at least to perform and/or control the deriving of the respective positions of the one or more beacons from the coverage map and the providing of the fourth information, and further one or more of the first determining and the providing of the first information, the second determining and the providing of the second information, and the third determining and the providing of the third information, wherein at least for those one or more beacons, to which the first information, the second information and/or the third information respectively pertains, information representative of their derived positions is provided.

13. A method performed and/or controlled by at least one apparatus, the method comprising one or more of the following:
  a first determining whether or not at least one characteristic that has been derived from a coverage map being representative of respective coverage areas of a plurality of beacons deployed in an area is affected at least by a count of the beacons deployed in the area and to their respective positions and affects an accuracy of a positioning of one or more terminals located in the area that is at least based on the coverage map and on respective fingerprints provided by the one or more terminals, is considered at least partially insufficient, and a providing, in case the first determining has come to an affirmative result, of first information on the at least one characteristic considered at least partially insufficient and/or on instances that at least contributed to the at least one characteristic being considered at least partially insufficient;
  a second determining, at least based on one or more fingerprints provided by one or more terminals, whether or not an existing coverage map for an area can still be considered to be representative of respective coverage areas of a plurality of beacons deployed in the area, and a providing, in case the second determining has come to an affirmative result, of second information indicative of the result and/or indicative of why the existing coverage map is no longer considered to be representative of the respective coverage areas of the plurality of beacons deployed in the area;

a third determining whether or not a status of a beacon on which information is transmitted by the beacon and received and provided by a terminal is considered improvable, and a providing, in case the third determining has come to an affirmative result, of third information on the beacon and/or on the status of the beacon; and a deriving, from a coverage map that is representative of respective coverage areas of a plurality of beacons deployed in an area, of respective positions of one or more of the beacons, and a providing of fourth information representative of one or more of the derived respective positions of the one or more beacons.

14. The method according to claim 13, comprising at least the first determining and the providing of the first information, wherein at least one of the at least one characteristic considers at least one or more of the following:

respective numbers of all respective one or more beacons respectively observable at a plurality of pre-defined locations in the area or of a subgroup of these all respective one or more beacons;

at least one characteristic of respective signal strengths with which one or more respective beacons are respectively observable at a plurality of pre-defined locations in the area;

respective arrangements of one or more respective beacons respectively observable at a plurality of pre-defined locations in the area with respect to the respective pre-defined location;

respective distances between beacons of the beacons and other beacons of the beacons.

15. The method according to claim 13, comprising at least the first determining and the providing of the first information, wherein the at least one characteristic comprises one or more of the following:

a first characteristic that is a set of respective numbers of all respective one or more beacons respectively observable at a plurality of pre-defined locations in the area or of a subgroup of these all respective one or more beacons; the first characteristic being considered at least partially insufficient if one or more of the numbers of the set is smaller than or equal-to-or-smaller-than a predefined threshold;

a second characteristic that is a set of respective properties of respective signal strengths with which one or more respective beacons are respectively observable at a plurality of pre-defined locations in the area; the second characteristic being considered at least partially insufficient if one or more of the properties of the set of properties are in pre-defined relation with respect to a pre-defined threshold;

a third characteristic that is a set of respective measures related to a respective arrangement of one or more respective beacons observable at a plurality of pre-defined locations in the area with respect to the respective pre-defined location; the third characteristic being considered at least partially insufficient if one or more of the measures of the set are in a pre-defined relation with respect to a pre-defined threshold;

a fourth characteristic that is a set of respective distances between all beacons of the beacons and their respectively closest neighboring beacon of the beacons, the fourth characteristic being considered at least partially insufficient if one or more of the distances are larger or equal-to-or-larger-than a pre-defined threshold.

16. The method according to claim 13, comprising at least the second determining and the providing of the second information, wherein one or more of the following is considered in the second determining:

a deviation of a strength of a respective signal received from a beacon by at least one terminal at an estimated position in the area from a value indicated by the existing coverage map for this position and beacon;

at least one beacon in the area that has been observed by one or more terminals but is not yet represented in the existing coverage map;

at least one beacon represented in the existing coverage map by a coverage area but which is not observed by one or more terminals at respective estimated positions within the coverage area;

at least one beacon represented in the existing coverage map by a coverage area but which is observed by one or more terminals at respective estimated positions outside the coverage area.

17. The method according to claim 13, comprising at least the second determining and the providing of the second information, wherein it is determined that the existing coverage map is no longer considered to be representative of respective coverage areas of the plurality of beacons deployed in the area in one or more of the following cases:

a number of beacons, for any of which in at least a pre-defined number of instances, a deviation of a strength of a respective signal received from the beacon by a respective terminal at a respective estimated position in the area from a value indicated by the existing coverage map for this respective position and beacon is larger than or larger-than-or-equal-to a pre-defined threshold, is larger than or larger-than-or-equal-to a pre-defined threshold;

a number of beacons, each of which has been observed by one or more respective terminals but is not yet represented in the existing coverage map, is larger than or larger-than-or-equal-to a pre-defined threshold;

a number of beacons, each of which is represented in the existing coverage map by a respective coverage area but is not observed by one or more respective terminals at respective estimated positions within the respective coverage area, is larger than or larger-than-or-equal-to a pre-defined threshold;

a number of beacons, each of which is represented in the existing coverage map by a respective coverage area but is observed by one or more terminals at respective estimated positions outside the respective coverage area, is larger than or larger-than-or-equal-to a pre-defined threshold.

18. The method according to claim 13, comprising at least the third determining and the providing of the third information, wherein the status of the beacon is related to a power source of the beacon, in particular to a battery thereof.

19. The method according to claim 13, comprising the deriving of the respective positions of the one or more beacons from the coverage map and the providing of the fourth information, wherein the respective position of at least one the one or more beacons is determined as the position where the coverage map indicates a maximum value of a strength of a signal received from the beacon.

20. A non-transitory computer-readable storage medium storing computer program code, the computer program code when executed by a processor causing an apparatus to perform:

a first determining whether or not at least one characteristic that has been derived from a coverage map being representative of respective coverage areas of a plurality of beacons deployed in an area is affected at least by a count of the beacons deployed in the area and to their respective positions and affects an accuracy of a positioning of one or more terminals located in the area that is at least based on the coverage map and on respective fingerprints provided by the one or more terminals, is considered at least partially insufficient, and a providing, in case the first determining has come to an affirmative result, of first information on the at least one characteristic considered at least partially insufficient and/or on instances that at least contributed to the at least one characteristic being considered at least partially insufficient;

a second determining, at least based on one or more fingerprints provided by one or more terminals, whether or not an existing coverage map for an area can still be considered to be representative of respective coverage areas of a plurality of beacons deployed in the area, and a providing, in case the second determining has come to an affirmative result, of second information indicative of the result and/or indicative of why the existing coverage map is no longer considered to be representative of the respective coverage areas of the plurality of beacons deployed in the area;

a third determining whether or not a status of a beacon on which information is transmitted by the beacon and received and provided by a terminal is considered improvable, and a providing, in case the third determining has come to an affirmative result, of third information on the beacon and/or on the status of the beacon; and a deriving, from a coverage map that is representative of respective coverage areas of a plurality of beacons deployed in an area, of respective positions of one or more of the beacons, and a providing of fourth information representative of one or more of the derived respective positions of the one or more beacons.

* * * * *